US011034341B2

United States Patent
Wulf

(10) Patent No.: US 11,034,341 B2
(45) Date of Patent: Jun. 15, 2021

(54) ELECTRONICALLY CONTROLLABLE PNEUMATIC BRAKE SYSTEM IN A UTILITY VEHICLE AND METHOD FOR ELECTRONICALLY CONTROLLING A PNEUMATIC BRAKE SYSTEM IN A UTILITY VEHICLE

(71) Applicant: WABCO Europe BVBA, Brussels (BE)

(72) Inventor: Oliver Wulf, Neustadt (DE)

(73) Assignee: ZF CV Systems Europe BV, Brussels (BE)

( * ) Notice: Subject to any disclaimer, the term of this patent is extended or adjusted under 35 U.S.C. 154(b) by 295 days.

(21) Appl. No.: 16/329,225

(22) PCT Filed: Jul. 17, 2017

(86) PCT No.: PCT/EP2017/000860
§ 371 (c)(1),
(2) Date: Feb. 28, 2019

(87) PCT Pub. No.: WO2018/041385
PCT Pub. Date: Aug. 8, 2018

(65) Prior Publication Data
US 2019/0248351 A1    Aug. 15, 2019

(30) Foreign Application Priority Data
Aug. 31, 2016    (DE) ............... 10 2016 010 464.3

(51) Int. Cl.
*B60T 13/74*    (2006.01)
*B60T 13/68*    (2006.01)
(Continued)

(52) U.S. Cl.
CPC ............ *B60T 13/683* (2013.01); *B60T 7/06* (2013.01); *B60T 13/586* (2013.01);
(Continued)

(58) Field of Classification Search
CPC .... B60T 13/683; B60T 13/385; B60T 15/027; B60T 15/043; B60T 15/045; B60T 17/227
See application file for complete search history.

(56) References Cited

U.S. PATENT DOCUMENTS

| 7,520,572 B2 | 4/2009 | Hatipoglu et al. |
| 8,651,588 B2 | 2/2014 | Bensch et al. |

(Continued)

FOREIGN PATENT DOCUMENTS

| DE | 10236922 A1 | 3/2004 |
| DE | 102005060225 A1 | 6/2007 |

(Continued)

OTHER PUBLICATIONS

Abstract for DE-102018126312 (2020).*
Abstract for DE-102016010462 (2018).*

*Primary Examiner* — Nicholas J Lane
(74) *Attorney, Agent, or Firm* — Leydig, Voit & Mayer, Ltd.

(57) ABSTRACT

An electronically controllable pneumatic brake system for a vehicle includes wheel brakes for braking wheels of the vehicle, wherein axle modulators specify a service brake braking pressure to the wheel brakes in dependence upon a service brake control pressure. The brake system further includes a foot brake valve configured to pneumatically specify the service brake control pressure to the axle modulators, wherein the service brake control pressure can be generated by the foot brake valve in dependence upon a mechanical imposition or in dependence upon an electropneumatic imposition. The brake system additionally includes a bypass valve arrangement configured to specify a foot brake input pressure to the foot brake valve, the foot brake input pressure being used as an electropneumatic imposition.

19 Claims, 7 Drawing Sheets

(51) Int. Cl.
  *B60T 15/02* (2006.01)
  *B60T 15/04* (2006.01)
  *B60T 7/06* (2006.01)
  *B60T 13/58* (2006.01)
  *B60T 17/22* (2006.01)
  *B60T 7/04* (2006.01)

(52) U.S. Cl.
  CPC .......... *B60T 15/027* (2013.01); *B60T 15/043* (2013.01); *B60T 17/227* (2013.01); *B60T 7/04* (2013.01)

(56) References Cited

U.S. PATENT DOCUMENTS

| | | | |
|---|---|---|---|
| 9,676,378 | B2 | 6/2017 | Kiel et al. |
| 9,764,724 | B2 | 9/2017 | Kiel et al. |
| 9,896,072 | B2 | 2/2018 | Roters |
| 10,137,875 | B2 | 11/2018 | Hecker et al. |
| 2006/0152075 | A1 | 7/2006 | Goebels et al. |
| 2017/0158183 | A1* | 6/2017 | Hecker .................. B60T 8/342 |
| 2017/0267221 | A1* | 9/2017 | Hecker ................. B60T 13/683 |
| 2018/0370507 | A1* | 12/2018 | Eckert .................... B60T 8/268 |
| 2019/0152459 | A1* | 5/2019 | Dieckmann ........... B60T 13/662 |
| 2019/0193705 | A1* | 6/2019 | Wulf ..................... B60T 13/662 |
| 2019/0248349 | A1* | 8/2019 | Wulf ......................... B60T 8/94 |
| 2019/0248350 | A1* | 8/2019 | Wulf ..................... B60T 13/683 |
| 2019/0248351 | A1* | 8/2019 | Wulf ..................... B60T 13/586 |
| 2020/0172073 | A1* | 6/2020 | Wieder ................... B60T 13/26 |

FOREIGN PATENT DOCUMENTS

| | | | | |
|---|---|---|---|---|
| DE | 102010050578 | A1 | 5/2012 | |
| DE | 102010050580 | A1 | 5/2012 | |
| DE | 102012015949 | A1 | 3/2014 | |
| DE | 102013015949 | A1 | 3/2015 | |
| DE | 102013015971 | A1 | 4/2015 | |
| DE | 102014112014 | A1 | 2/2016 | |
| DE | 102016010462 | A1 * | 3/2018 | ............. B60T 13/683 |
| DE | 102018126312 | A1 * | 4/2020 | ............. B60T 13/683 |
| EP | 1099611 | A2 | 5/2001 | |
| EP | 1730006 | B1 | 12/2012 | |
| EP | 2055541 | B1 | 3/2013 | |
| EP | 2532559 | B1 | 5/2015 | |
| WO | 2016045652 | A1 | 3/2016 | |
| WO | WO-2017036569 | A1 * | 3/2017 | ................ B60T 8/17 |

* cited by examiner

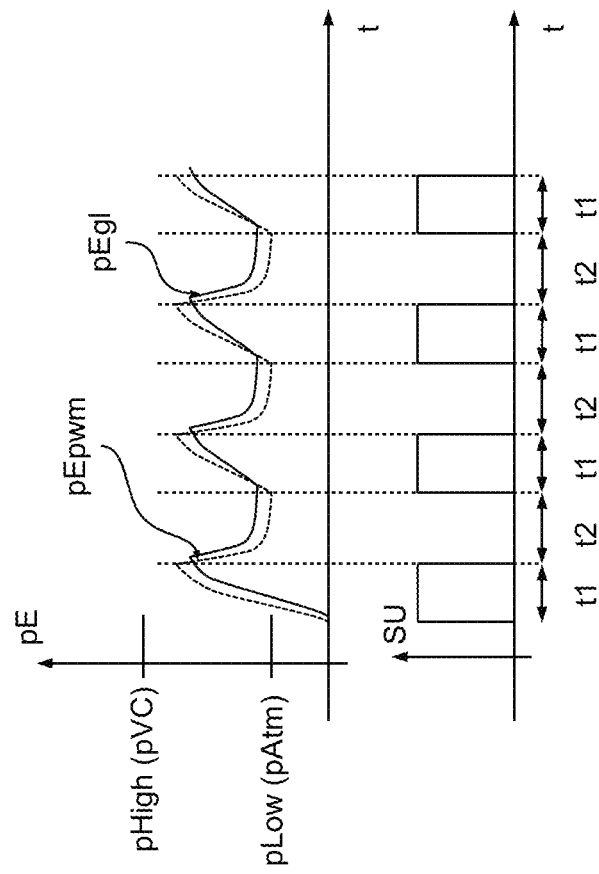

ELECTRONICALLY CONTROLLABLE PNEUMATIC BRAKE SYSTEM IN A UTILITY VEHICLE AND METHOD FOR ELECTRONICALLY CONTROLLING A PNEUMATIC BRAKE SYSTEM IN A UTILITY VEHICLE

CROSS REFERENCE TO RELATED APPLICATIONS

This application is a U.S. National Stage Application under 35 U.S.C. § 371 of International Application No. PCT/EP2017/000860 filed on Jul. 17, 2017, and claims benefit to German Patent Application No. DE 10 2016 010 464.3 filed on Aug. 31, 2016. The International Application was published in German on Mar. 8, 2018 as WO 2018/041385 A1 under PCT Article 21(2).

FIELD

The invention relates to an electronically controllable pneumatic brake system in a commercial vehicle and also to a method for electronically controlling a pneumatic brake system.

BACKGROUND

In vehicles, in particular commercial vehicles, having a pneumatic brake system, axle modulators that are allocated to the vehicle axles may be actuated electronically by a control unit (ECU) so as to impose braking pressures. In this case, the electronic actuation is performed either in dependence upon a driver request that is specified by means of a foot brake valve or in dependence upon a vehicle desired deceleration that is specified in an automated manner. The axle modulators then pneumatically generate a corresponding service brake braking pressure that is imposed upon brake cylinders of the service brakes of the brake system.

Alternatively, the axle modulators may also be actuated pneumatically in that a service brake control pressure that corresponds to the driver request is imposed upon the axle modulators by the foot brake valve and in dependence upon said service brake control pressure the respective axle modulator generates the corresponding service brake braking pressure for the service brakes by means of increasing the quantity of air. An ABS functionality is integrated into both variants with the result that it is possible to prevent the wheels locking up during the braking procedure.

Several solutions are known in order to also provide in braking systems of this type a fall-back level or redundancy that may be actuated in an automated manner, and that is able to engage in an automated manner in an emergency situation if the driver by way of example is not paying attention or not at the wheel. Solutions of this type usually require a plurality of additional pneumatic components since in the case of these solutions a graded specification of a braking procedure is also provided. Further complex solutions that render possible an electrically-redundant actuation are also known, by way of example via an electropneumatic actuation of a parking brake. The disadvantage in the case of all these solutions is that the additional pneumatic components increase the assembly and cost outlay and moreover are very cumbersome to retrofit.

DE 10 2013 015 949 A1 describes for this purpose a brake system for assisting a driver when negotiating bends, wherein it is provided to impose a service brake braking pressure upon service brakes of the brake system using an electronically controlled multi-directional control valve, wherein a service brake braking pressure is imposed even if a braking request is not made by a foot brake valve as a brake encoder. The multi-directional control valve and the foot brake valve are connected via a shuttle valve (select high valve) to a relay valve that imposes the service brake braking pressure upon the service brakes. The shuttle valve in this case just transmits the higher of the two pressures from the foot brake valve or the multi-directional control valve to the relay valve with the result that the electronic braking request of the multi-directional control valve may be overridden by means of the foot brake valve.

DE 10 2010 050 578 A1 or DE 10 2010 050 580 A1 disclose a brake system in which a braking request is specified via a foot brake valve or a brake pedal device. This braking request is converted into an electronic signal in a control unit and an axle modulator is actuated using the electronic signal, said axle modulator imposing the service brake braking pressure upon the service brakes. If the electronics system fails, in the redundancy case the axle modulator is actuated pneumatically via compressed air lines using a service brake control pressure via which a service brake braking pressure is imposed upon the service brakes. The axle modulator comprises for this purpose three solenoid valves and one relay valve. Depending upon the position of the solenoid valves, the actuating pressure that is imposed by the foot brake valve, the reservoir pressure from the pressure medium reservoir or the atmospheric pressure from a venting procedure is used as the service brake control pressure. As a consequence, in dependence upon a manual or electrical imposition, the service brake braking pressure may be increased, maintained or reduced depending upon the switch position of the three solenoid valves, said switch position being specified electronically.

WO 2016/045652 A1 discloses an electropneumatic service brake unit having a foot brake valve whose brake pedal position may be sensed and whose output actuating pressure may be modified independently of a brake pedal position in order to actuate the axle modulators. For this purpose, a solenoid valve unit having by way of example two 3/2 directional control valves is provided, said unit introducing a foot brake input pressure into the foot brake valve depending upon the electronic request. The acting foot brake input pressure is maintained via an additional holding valve. A control piston is mechanically moved in the foot brake valve pneumatically by means of the active foot brake input pressure with the result that an actuating pressure that corresponds to the pneumatic actuation is output by the foot brake valve and said actuating pressure is relayed to the axle modulators as the brake valve control pressure. As a consequence, in the redundancy case in other words if the electrical actuation of the service brakes fails and if a manual actuation has not been performed by the driver a braking procedure may be performed via the foot brake valve and its pneumatic duct. Consequently, a quasi electronically controlled, mechanical-pneumatic actuation of the foot brake valve is provided.

A further mechanical actuation of the foot brake valve is disclosed by way of example in U.S. Pat. No. 7 520 572 B2 and EP 1 730 006 B1. In this case, a method is respectively disclosed in which the foot brake valve may be actuated in addition to the brake pedal by an electronic control unit. An electronic brake system is accordingly provided and the service brakes of said brake system are actuated by means of the foot brake valve and via an additional relay valve. The braking request may on the one hand be imposed via the brake pedal upon the foot brake valve or may be imposed independently thereof via a brake valve actuator that is arranged between the brake pedal and the foot brake valve. The brake valve actuator is controlled by means of the electronic control unit in that, if a control signal for braking the vehicle is present, a control pressure is imposed upon the brake valve actuator, which is embodied by way of example as a pneumatic valve, with the result that the foot brake valve is actuated.

DE 10 2013 015 971 A1 discloses a braking device in which the foot brake valve is pneumatically connected to the service brakes via a directional control valve. In a first switch position of the directional control valve, the actuating pressure that is generated by the foot brake valve by means of manual actuation is directly imposed upon the service brakes. In a second switch position, a non-return valve is switched between the foot brake valve and the service brakes. The non-return valve renders it possible to increase the pressure that is produced by the foot brake valve at the service brakes, however said non-return valve prevents the pressure of the service brakes from reducing or venting and consequently ensures that the service brake braking pressure that is built up is maintained.

EP 2 532 559 B1 discloses a brake system that comprises two 2/2 directional control valves and also at least one select high valve. The 2/2 directional control valves may be electronically switched in dependence upon a measured service brake control pressure in such a manner that a pressure medium that flows in from the pressure medium reservoir is short circuited to a reservoir pressure or a venting procedure to the select high valve. As a consequence, it is possible to increase or reduce the service brake braking pressure in an electrically controlled manner. The service brake control pressure may also be maintained by means of a corresponding switch position of the 2/2 directional control valves. In addition, the actuating pressure that is specified by the driver by means of actuating the foot brake valve is also transmitted to the select high valve. The select high valve then outputs the higher of the two prevailing pressures to the service brakes, in other words either the reservoir input pressure or the foot brake input pressure, which is provided by the corresponding bypass valve, or the actuating pressure. Consequently, pressure may be increased, maintained or reduced using two 2/2 directional control valves and a select high valve in an electronically controlled manner if a manual actuation is not performed by the driver.

EP 2 055 541 B1 discloses a driver assist system having a bistable and a monostable 3/2 directional control valve. A spring accumulator of a parking brake may be aerated or vented via the bistable 3/2 directional control valve in that in the case of a corresponding switch position of the bistable 3/2 directional control valve either the pressure medium reservoir for releasing the spring accumulator or a venting facility for applying the spring accumulator are connected to a pneumatic control input of an axle modulator. The monostable 3/2 directional control valve is arranged between the bistable 3/2 directional control valve and the axle modulator and said monostable directional control valve permits the through-flow of the parking brake control pressure that is imposed by the bistable 3/2 directional control valve upon the axle modulator in one switch position and otherwise prevents a flow connection. In other words, in the second switch position of the monostable 3/2 directional control valve, the prevailing parking brake control pressure is maintained at the axle modulator.

SUMMARY

In an embodiment, the present invention provides an electronically controllable pneumatic brake system for a vehicle. The electronically controllable pneumatic brake system includes wheel brakes for braking wheels of the vehicle, wherein axle modulators specify a service brake braking pressure to the wheel brakes in dependence upon a service brake control pressure. The brake system further includes a foot brake valve configured to pneumatically specify the service brake control pressure to the axle modulators, wherein the service brake control pressure can be generated by the foot brake valve in dependence upon a mechanical imposition or in dependence upon an electropneumatic imposition, and a bypass valve arrangement configured to specify a foot brake input pressure to the foot brake valve, the foot brake input pressure being used as an electropneumatic imposition. The bypass valve arrangement imposes a low pressure level upon the foot brake valve in a first switch position and the bypass valve arrangement imposes a high pressure level upon the foot brake valve in a second switch position as an electropneumatic imposition with the result that the foot brake input pressure may be specified in dependence upon the low pressure level and/or in dependence upon the high pressure level. The bypass valve arrangement is flowably connected to a venting chamber of the foot brake valve with the result that the foot brake input pressure that is specified by the bypass valve arrangement may be passed through as an electropneumatic imposition via the venting chamber and an operating chamber of the foot brake valve directly to the axle modulators as a service brake control pressure.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 1b, c, d illustrate variants for supplying energy to the electropneumatically controlled brake system in accordance with FIG. 1a;

FIG. 2 illustrates a temporal curve of a pulsed foot brake input pressure;

DETAILED DESCRIPTION

Figure 1A:
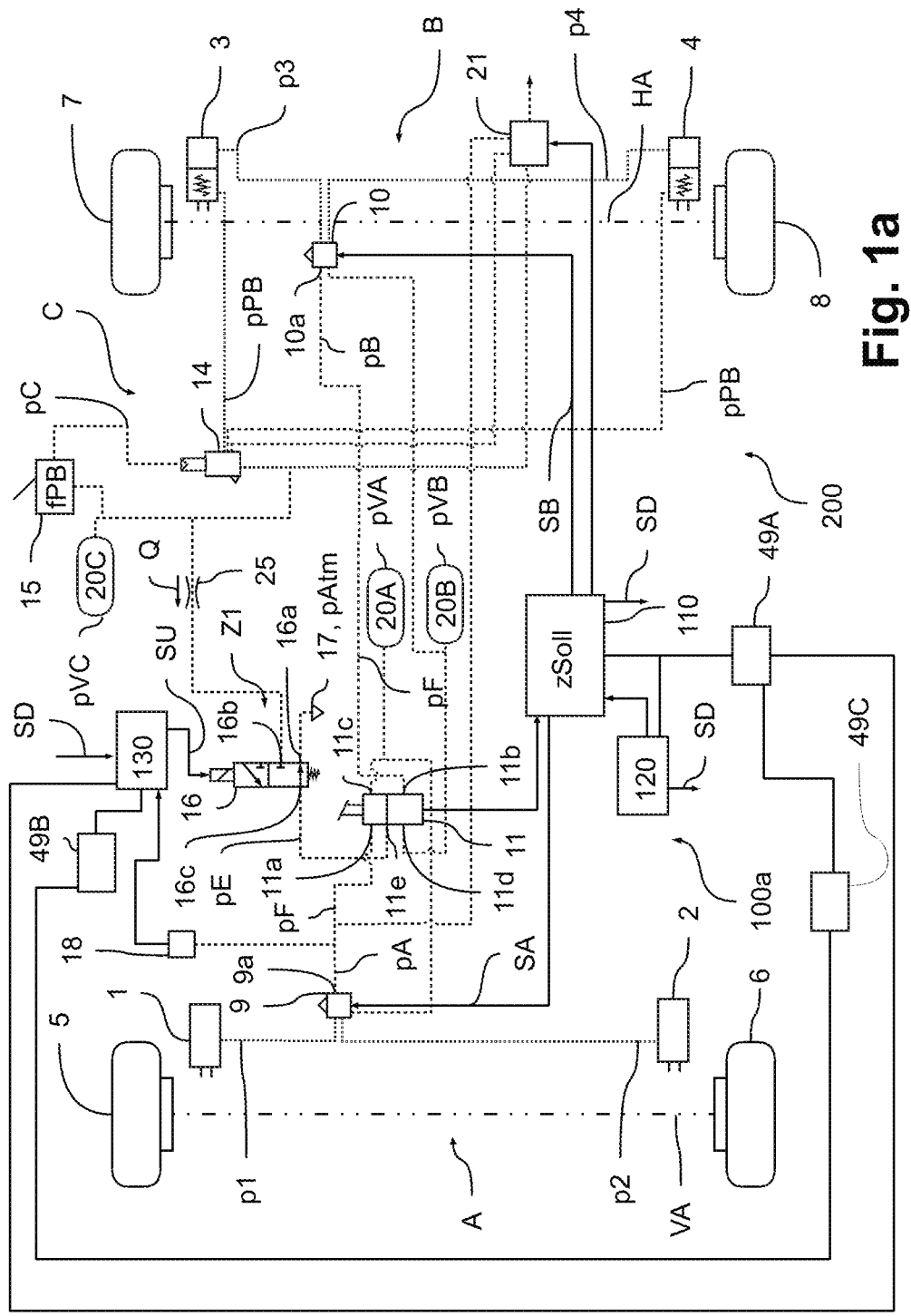
FIG. 1a illustrates, as a block circuit diagram, a brake system having a first bypass valve arrangement according to an embodiment of the invention.

Embodiments of the invention provide electronically controllable pneumatic brake systems for commercial vehicles with which it is possible with minimal outlay to ensure a safe and reliable electronically controlled redundant braking procedure, in particular in a vehicle that is controlled in an automated manner. Furthermore, embodiments of the invention provide methods for electronically controlling such brake systems.

In accordance with the invention, it is provided for this purpose that a service brake control pressure that is specified by a foot brake valve may be generated so as to actuate at least one axle modulator of an electronically controllable pneumatic brake system in dependence upon a pressure medium that is introduced into a venting chamber of the foot brake valve, said pressure medium comprising a foot brake input pressure. Preferably the service brake control pressure in this case—in particular in a redundancy case—is not specified in dependence upon a movement of a control piston of the foot brake valve, said movement being initiated manually or automatically.

On the contrary, in particular in the redundancy case, pressure medium at a specified foot brake input pressure is preferably introduced into a foot brake venting connection of the foot brake valve with the result that said pressure medium may flow via the venting chamber and also an operating chamber into one or multiple control connections of the foot brake valve when the foot brake valve is not actuated. The control connections are connected respectively to a pneumatic control input for a pneumatic fall-back level of the at least one axle modulator that is allocated to a braking circuit with the result that the foot brake input pressure essentially prevails as the service brake control pressure at the pneumatic control input of the axle modulator. In this case, by way of example losses of pressure may occur by means of the throughflow of the foot brake valve. The service brake control pressure is increased by means of an amount of air by the respective axle modulator and is imposed as the service brake braking pressure so as to apply pressure to wheel brakes or service brakes of the vehicle with the result that the vehicle may be braked via the respective actuated service brakes.

Alternatively, it may also be provided that the axle modulator is omitted in the corresponding braking circuits and the service brake control pressure that is output by the foot brake valve is imposed directly as the service brake braking pressure upon the service brakes of the vehicle. This may be performed by way of example if the foot brake input pressure or the service brake control pressure are already designed in such a manner that an increase in the quantity of air by means of the axle modulator is no longer required in order to accordingly actuate the service brakes.

Consequently, a mechanical actuation of the foot brake valve is advantageously not initiated by means of the pressure medium that is introduced into the venting chamber using the foot brake input pressure. The term "mechanical actuation of the foot brake valve" in this case is understood to mean an arbitrary movement of the control piston of the foot brake valve, said movement being requested manually or automatically, by way of example initiated in an electrical, mechanical or pneumatic manner. In this case, the control piston is the piston in the foot brake valve, which during an actuation of an actuating unit, by way of example of the brake pedal, converts said mechanical actuation into a throughflow of pressure medium from the pressure medium reservoir through the operating chamber to the control connections of the foot brake valve, said throughflow being dependent upon the actuation. The control piston consequently ensures a graded release of pressure medium from an arbitrary pressure medium reservoir of the brake system to the axle modulators or the wheel brakes, wherein for this purpose by way of example further pistons, by way of example relay pistons and grading pistons, are influenced in the operating chamber. The control piston itself is for this purpose not arranged in the operating chamber itself but rather at most delimits said operating chamber. A pressure medium that flows into the operating chamber consequently at most acts upon the control piston in a pressure-releasing manner.

Consequently, in accordance with the invention an interface that is already present in the foot brake valve—the venting chamber or the foot brake venting connection—is used in a simple manner for the purpose of directly passing through a foot brake input pressure that is already determined in advance to the axle modulators as the service brake control pressure without in this case influencing the control piston in dependence upon the foot brake input pressure—by way of example via an additional hermetic control chamber—in order to mechanically actuate or move said control piston and consequently to influence a flow behavior of the pressure medium that is located in the operating chamber.

As a consequence, advantageously it is not necessary to make any changes to the existing pneumatic lines or to the foot brake valve itself in order to embody a redundancy, said changes possibly leading to influencing the normal operation or requiring unnecessarily high outlay, by way of example in order to provide an hermetic control chamber. Consequently, the assembly outlay and the reliability may be increased. Moreover, simple retrofittability is provided since apart from the venting facility it is not necessary to make any changes to the existing pneumatic brake system.

The foot brake input pressure, which specifies the service brake control pressure, is imposed in the redundancy case in accordance with the invention via a first bypass valve arrangement that in accordance with one embodiment is embodied as an electrically controllable 3/2 directional control valve. In a first switch position of the 3/2 directional control valve, a low pressure level is imposed in that the venting chamber of the foot brake valve is connected by way of example to a bypass venting facility, and in a second switch position a high pressure level is imposed in that by way of example a bypass pressure medium reservoir is connected to the venting chamber. Consequently, the venting chamber may be vented in the first switch position with the result that an approximate atmospheric pressure prevails in said venting chamber, and in the second switch position the bypass reservoir pressure, by way of example 8 bar, which prevails in the bypass pressure medium reservoir may be set in the venting chamber in that the pressure medium from the bypass pressure medium reservoir is introduced via the 3/2 directional control valve and the foot brake venting connection into the venting chamber of the foot brake valve. The bypass pressure medium reservoir may be in this case by way of example the pressure medium reservoir for a parking brake braking circuit of the commercial vehicle or however also an additional, separate pressure medium reservoir in the commercial vehicle.

In accordance with a further embodiment, an alternative second bypass valve arrangement comprises two electrically controllable 2/2 directional control valves that may be opened and closed respectively. A first 2/2 directional control valve is connected to the bypass venting facility so as to impose the low pressure level and a second 2/2 directional control valve is connected to the bypass pressure medium reservoir so as to impose a high pressure level, wherein the two 2/2 directional control valves issue into the venting chamber or the foot brake venting connection. If the first 2/2 directional control valve is opened and the second 2/2 directional control valve is closed (first switch position for the two 2/2 directional control valves), the bypass venting facility is flowably connected to the venting chamber of the foot brake valve. Conversely, if the first 2/2 directional control valve is closed and the second 2/2 directional control valve is opened (second switch position for the two 2/2 directional control valves), the bypass pressure medium reservoir is flowably connected to the venting chamber of the foot brake valve. Consequently, in this embodiment a foot brake input pressure that corresponds to the atmospheric pressure or to the bypass reservoir pressure may also be imposed, said foot brake input pressure setting a corresponding service brake control pressure via the venting chamber and the operating chamber.

In addition, the foot brake input pressure may also be controlled in this second bypass valve arrangement in that the outgoing foot brake input pressure is measured by way of example at the foot brake venting connection by a pressure sensor and the first or second 2/2 directional control valve is accordingly opened or closed in order to adjust the foot brake input pressure upward or downward. The foot brake input pressure may in addition also be maintained in this embodiment by means of closing the two 2/2 directional control valves.

The first and the second bypass valve arrangement are electronically actuated respectively via a bypass signal by a bypass control unit (bypass ECU) in the redundancy case, in other words in the event of a failure of the electrical actuation of the axle modulators via a service brake control unit (ECU) of the brake system and if it is determined that a braking procedure is required and the driver does not trigger said braking procedure himself. In the redundancy case, an electropneumatically controlled increase of the service brake control pressure to the foot brake input pressure may therefore be performed via the second switch position of the respective bypass valve arrangement with the result that a corresponding high service brake braking pressure that preferably actuates the service brakes to the maximum extent is produced by the respective axle modulators. In the first switch position of the respective bypass valve arrangement an electropneumatically controlled venting procedure may also be performed and consequently a reduction in the service brake control pressure or in the service brake braking pressure may be achieved.

Consequently, an electropneumatically controlled full closing procedure or a full opening procedure of the service brakes may be achieved in a simple manner by means of the corresponding switch position of the respective bypass valve arrangement. In accordance with the invention, it is accordingly identified that in a vehicle, in particular in a commercial vehicle that may be controlled in an automated manner, in the event of a failure in the electrical actuation of the service brakes of the vehicle via the respective axle modulator it is merely necessary to bring the vehicle safely into a braked state, in particular to a standstill, without in this case influencing the normal operation. Advantageously, this may be achieved by means of only one additional 3/2 directional control valve or two 2/2 directional control valves and also a corresponding actuating logic that ensure in the redundancy case that an electropneumatic imposition may be implemented using a high foot brake input pressure. In this case, the additional bypass valve arrangement does not influence the manual operation and simultaneously ensures that a safe venting procedure is possible when not in the redundancy case.

Cost-intensive valves, by way of example multiple solenoid valves that ensure a graded braking procedure or a select high valve that either permits the throughflow of the pressure from the foot brake valve or the bypass pressure medium reservoir, are therefore advantageously not required in order to embody an electropneumatic redundancy of this type. In accordance with the invention, it is consequently identified that the probability of a total failure of the electrical, automated actuation of the service brakes in a vehicle during the serviceable life is very low and therefore a solution that is optimized in particular with regard to noise emission as the corresponding valve is switched, the consumption of pressure medium and the wear of the wheel brakes is not necessarily required. All of these aspects do not have negative effects on a safe redundant braking procedure of the vehicle, with the result that said aspects are not to be taken into account for this specific exceptional case or negative effects of said aspects may be accepted in order to save costs.

In the redundancy case, the foot brake valve may output a service brake control pressure that is dependent upon a purely mechanical imposition—that is controlled manually by the driver or automatically—by means of actuating the foot brake valve or in dependence upon the electropneumatic imposition by means of the foot brake input pressure that is imposed by the bypass valve arrangement in which case the foot brake valve is not actuated. However, if the foot brake valve is actuated, the piston position that is consequently produced preferably prevents that pressure medium having the foot brake input pressure passes from the venting chamber and the operating chamber into the control connections of the foot brake valve. In the case of a manual or automatically controlled, purely mechanical actuation of the foot brake valve, implementation of the electropneumatic imposition is consequently prevented.

The bypass valve arrangement is preferably monostable, in other words only the first switch position of the bypass valve arrangement, in which the venting chamber is vented, is stable. The term "stable" in this case is understood to mean that without an electrical actuation of the bypass valve arrangement, in other words in the non-energized state, the stable (first) switch position is automatically set. This may be achieved by way of example by means of a corresponding spring preloading of the 3/2 directional control valve or the two 2/2 directional control valves. As a consequence, in the normal operation it may be ensured even when not in the redundancy case that in the event of a failure of the energy supply a venting procedure may be performed safely since the bypass valve arrangement automatically falls back into the first switch position.

The first stable switch position is in this case set as standard if it may be assumed that the driver may engage the brakes even in the redundancy case. The second non-stable switch position is conversely set if it is determined that the foot brake valve is not actuated in the redundancy case because the driver by way of example is not at the wheel or is not paying attention. The second switch position may be continuously set in this case by way of example by means of being permanently energized with the result that the service brakes are permanently applied.

In accordance with an advantageous further development, using the first bypass valve arrangement a graded setting of the service brake control pressure or of the service brake braking pressure may also be performed in an electropneumatically controlled manner. For this purpose, the bypass valve arrangement of the bypass control unit may be actuated by way of example in a pulsed manner, in other words the first bypass valve arrangement or the 3/2 directional control valve is alternately energized and not energized. The bypass signal in this case is preferably provided in a pulse-width modulated manner. As a consequence, switching is performed alternately back and forth between the first and the second switch position with the result that depending upon the duration of the set first and second switch position, the foot brake input pressure oscillates back and forth between the where applicable pressure-adjusted bypass reservoir pressure and the atmospheric pressure in the bypass venting facility, in other words said foot brake input pressure is specified in dependence upon the two pressures. A pulsing curve of the service brake control pressure that is output by the foot brake valve is therefore also provided. A likewise pulsing service brake braking pressure that is output by the respective axle modulator in turn results therefrom, said service brake braking pressure being implemented by the service brakes in a corresponding manner in a braking procedure.

A graded specification of the foot brake input pressure may also be performed in the case of the second bypass valve arrangement according to this system in that the two 2/2 directional control valves are actuated in a pulse-width modulated manner, by way of example in the event that a pressure sensor for measuring the foot brake input pressure is not present and consequently it is not possible to regulate pressure.

Advantageously, a type of intermittent braking may consequently be provided by means of which the vehicle is alternately more intensely and less intensely braked. This may have a positive effect on the driving stability and the steerability of the vehicle as in the redundancy case, in other words in the case of an electronic failure, it is not ensured that brake slip regulation procedure that is provided in the vehicle via an ABS functionality is functioning correctly. This may be replaced in this exceptional case by means of the intermittent braking function. The intermittent braking procedure may advantageously be achieved by virtue of the fact that it is ensured that in the case of a pulse-width modulated actuation it is possible for a wheel that tends to lock to rotate again. This is by way of example the case if the foot brake input pressure or the service brake braking pressure recurrently falls below a limit pressure of by way of example 1 bar at least for a limit time of by way of example 0.25 s. In this case, it is ensured that a wheel that tends to lock may again rotate.

As a consequence, a redundant ABS functionality having additional components may also be omitted. It is also identified here that costs may also be saved for the exceptional case of an electrical defect in that a simple replacement function is embodied that likewise may ensure a safe braking procedure.

The switching behavior that is initiated by means of the pulsed actuation is in this case configured in such a manner that during an intermittent braking procedure acceptable values are set for the vehicle deceleration, the driving stability and also the steerability.

The lines and valves that have a throughflow in this case ensure a type of low pass filtering that ensures that the foot brake input pressure and consequently also the service brake control pressure increase or decrease less intensely if switching back and forth between the two switch positions is performed. The flanks of the oscillating foot brake input pressure curve consequently increase less intensely or decrease less intensely with the result that in particular prior to the foot brake input pressure achieving the bypass reservoir pressure in the second switch position, the switching back into the first switch position is performed; the curve is therefore smoothed overall.

This smoothing procedure may be further optimized in that in accordance with one advantageous further development, the bypass reservoir pressure and consequently also the foot brake input pressure is pressure-adjusted with the result that it is avoided that the service brake control pressure increases to a very high pressure as the bypass valve arrangement is switched into the second switch position. For this purpose, multiple variants are possible that may be provided alternatively or in addition:

In the simplest embodiment, a throttle is arranged between the bypass pressure medium reservoir, which specifies the foot brake input pressure in the second switch position, and the bypass valve arrangement. This throttle reduces a volume flow of the pressure medium that flows out of the bypass pressure medium reservoir. As a consequence, the foot brake input pressure is not abruptly built up to the bypass reservoir pressure in the case of a switching procedure from the first into the second switch position but rather said foot brake input pressure increases slowly as a bottleneck is embodied in the flow path by means of the throttle. A switching back procedure into the first switch position is therefore performed at a point in time at which the foot brake input pressure has increased less intensely with the result that the curve is further smoothed overall.

In accordance with a further embodiment, it may be provided from the outset to use a bypass pressure medium reservoir in which a lower bypass reservoir pressure prevails. For this purpose, by way of example a pressure medium reservoir that is provided for a parking brake may be used, said pressure medium reservoir comprising a reservoir pressure of maximum 8 bar.

In accordance with a further embodiment, a pressure reducer may also be integrated as a component, said pressure reducer only permitting a throughflow of the pressure medium from the bypass pressure medium reservoir up to a specific limit pressure.

In all cases, by means of limiting the pressure or limiting the volume flow of the bypass reservoir pressure that is output, it is additionally possible to achieve that in the event of the bypass valve arrangement being unintentionally switched into the second switch position a resulting undesired requested vehicle deceleration is also limited.

In accordance with an advantageous further development, it may be determined by the bypass control unit via a pressure sensor or a pressure switch, at which the service brake control pressure of a specific vehicle axle prevails, whether or not the driver has actuated the foot brake valve. If the driver has actuated the foot brake valve, the pressure switch or the pressure sensor outputs a corresponding signal to the bypass control unit. That allows, in the redundancy case, to determine whether the driver reacts, and if necessary to switch off the redundant electrical actuation via the bypass valve arrangement. Furthermore, latent malfunctions may be identified via the consequently-derived driver request by means of a plausibility check.

Advantageously, the bypass control unit (bypass ECU) is supplied via a first energy source and additionally via a second energy source independent of the first, and the service brake control unit (ECU) of the brake system is only supplied via the first energy source, with the aim that, in case the electrical actuation via the service brake control unit (ECU) fails, a redundant electrically controlled braking procedure can nevertheless be effected. However, an energy supply may also be ensured in the redundancy case by means of a generator, by way of example an alternator, and/or a short-term accumulator and/or a high voltage accumulator that each function independently of the first energy source.

In the embodiment in accordance with FIG. 1a, a section from an electropneumatic brake system 100a of a vehicle 200, in particular a commercial vehicle, is illustrated as a block circuit diagram, wherein the electropneumatic brake system is embodied as an EBS brake system 100a, in other words a braking specification is performed in a purely electrical manner in the normal operation. The EBS brake system 100*a* comprises for this purpose four wheel brakes 1, 2, 3, 4 that are used for the purpose of braking the wheels 5, 6, 7, 8 of the vehicle 200. In order to perform the braking procedure, three braking circuits A, B, C are provided to which a pressure medium reservoir 20A, 20B, 20C is allocated respectively in order to supply the respective braking circuits A, B, C with a pressure medium and consequently to render it possible to build up a braking pressure p1, p2, p3, p4, pPB for the respective wheel brakes 1, 2, 3, 4. A corresponding reservoir pressure pVA, pVB, pVC prevails in each pressure medium reservoir 20A, 20B, 20C, wherein a reservoir pressure pVA, pVB of by way of example 12 bar prevails in the first and in the second pressure medium reservoir 20A, 20B and a bypass reservoir pressure pVC of by way of example 8 bar prevails in a bypass pressure medium reservoir 20C. The bypass pressure medium reservoir 20C in this case corresponds to a pressure medium reservoir that also supplies a third braking circuit C in which a parking brake is operated.

In a first braking circuit A, the wheel brakes 1, 2 are arranged at the wheels 5, 6 of a front axle VA, wherein the wheel brakes 1, 2 are embodied as service brakes. The wheel brakes 3, 4 at a rear axle HA are embodied as combined spring accumulator brakes and service brakes with the result that the wheels 7, 8 of the rear axle HA may be braked independently of one another on the one hand via a second braking circuit B via a service braking function and moreover also via the third braking circuit C via a parking brake function.

In the first two braking circuits A, B, the service brake braking pressures p1, p2, p3, p4 are generated in the normal operation via electrically controlled axle modulators 9, 10 in that control signals SA, SB are electrically transmitted by a service brake control unit 110 (ECU) to the axle modulators 9, 10 that then, supplied by the corresponding pressure medium reservoir 20A, 20B, impose a specific service brake braking pressure p1, p2, p3, p4. The level of the service brake braking pressures p1, p2, p3, p4 is produced in particular from a requested vehicle desired deceleration zSoll that in accordance with this exemplary embodiment follows from a request that is specified manually by the driver via a foot brake valve 11 or by an assistance control unit 120 (ADAS-ECU, (A)dvanced-(D)river-(AS)sistance) that is provided so as to control the vehicle 200 in an automated manner.

It is possible via a corresponding electrical actuation of the respective axle modulator 9, 10 to react to an ABS brake slip event at the wheels 5, 6, 7, 8 of the two vehicle axles VA, HA.

In the event of a failure or a defect in the electronic actuation of the two axle modulators 9, 10, it is possible to switch to a pneumatic fall-back level in that an actuating pressure pF is imposed, as a pneumatic service brake control pressure pA, pB, upon the respective axle modulator 9, 10, said actuating pressure being generated by means of an automated actuation or by means of the mechanical actuation of the foot brake valve 11, said mechanical actuation being specified by the driver, in other words by means of a mechanical imposition V1.

A first service brake control pressure pA in this case is transmitted from a first control connection 11*a* of the foot brake valve 11 to a first pneumatic control input 9*a* at the first axle modulator 9 and a second service brake control pressure pB is transmitted from a second control connection 11*b* of the foot brake valve 11 to a second pneumatic control input 10*a* at the second axle modulator 10. The respective axle modulator 9, 10 then increases the service brake control pressure pA, pB accordingly and imposes said control pressure as the service brake braking pressure p1, p2, p3 p4 upon the corresponding braking circuit A, B. The foot brake valve 11 in this case is supplied via a first supply connection 11*c* from the first pressure medium reservoir 20A and via a second supply connection 11*d* from the second pressure medium reservoir 20B.

Consequently, it is possible to switch from an electronic actuation of the axle modulators 9, 10 in the pneumatic redundancy case to a pneumatic actuation by means of mechanical actuation of the foot brake valve 11.

In the third braking circuit C, a parking brake relay valve 14 is provided that is actuated pneumatically via a parking brake control pressure pC that is specified by a parking brake valve 15, said parking brake control pressure being increased by means of an amount of air by the parking brake relay valve 14 in a usual manner and imposed as the parking brake braking pressure pPB upon the spring accumulator part in the wheel brakes 3, 4 of the rear axle HA. The parking brake control pressure pC is generated in accordance with this embodiment in dependence upon a manual actuation of the parking brake valve 15 by the driver who consequently specifies a specific parking brake force fPB. However, an electronic parking brake specification (not illustrated) may also be performed.

The first service brake control pressure pA or the parking brake control pressure pC may also be imposed via a trailer control valve 21 upon a trailer (not illustrated) in order to brake said trailer.

In the embodiment in accordance with the invention, the foot brake valve 11 in accordance with FIG. 1*a* is connected furthermore via a foot brake venting connection 11*e* to a directional control output 16*c* of a first bypass valve arrangement 16 that is embodied as a 3/2 directional control valve, via which directional control output a specific foot brake input pressure pE is imposed upon the foot brake valve 11 depending upon the switch position Z1, Z2 of the 3/2 directional control valve 16. The 3/2 directional control valve 16 is embodied as an electrically controllable 3/2 directional control valve, by way of example as a solenoid valve, and may be brought into two switch positions Z1, Z2. A first directional control input 16*a* of the 3/2 directional control valve 16 is connected to a bypass venting facility 17 and a second directional control input 16*b* is connected to the bypass pressure medium reservoir 20C that also supplies the third braking circuit C.

In the first switch position Z1 of the 3/2 directional control valve 16, the pressure that prevails in the bypass venting facility 17, said pressure corresponding approximately to an atmospheric pressure pAtm (approximately 1 bar), also acts at the directional control output 16*c* with the result that a foot brake input pressure pE is set at the foot brake venting connection 11*e* of the foot brake valve 11 by means of venting the foot brake valve 11, said foot brake input pressure corresponding approximately to the atmospheric pressure pAtm. In the second switch position Z2 of the 3/2 directional control valve 16, the bypass pressure medium reservoir 20C is connected to the directional control output 16*c* with the result that approximately the bypass reservoir pressure pVC that prevails in the bypass pressure medium reservoir 20C is set at the foot brake venting connection 11*e* of the foot brake valve 11 as the foot brake input pressure pE. In other words, it is possible to switch back and forth between a low pressure level pLow in the first switch position Z1 and a high pressure level pHigh in the second switch position Z2.

Figure 3:
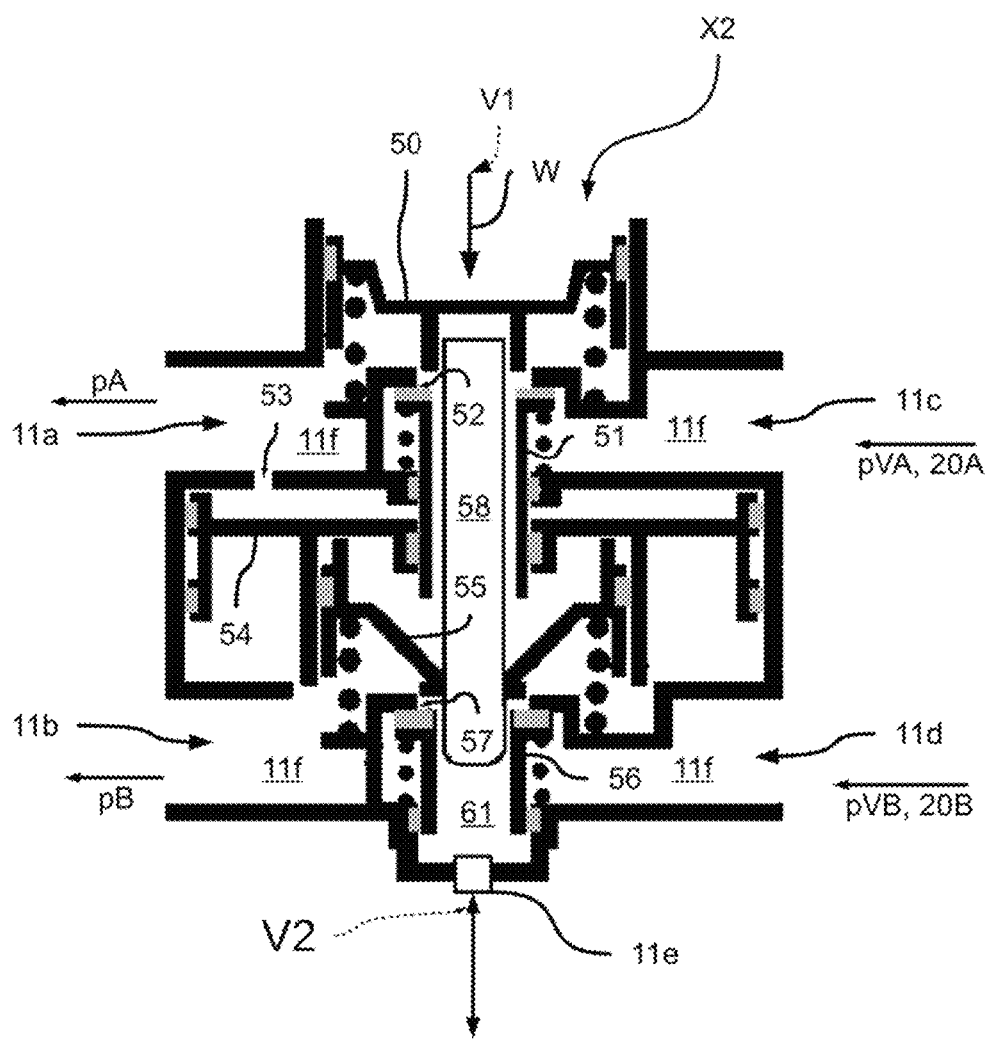
FIG. 3 illustrates an exemplary construction of a foot brake valve.

Consequently, in the first switch position Z1 a low foot brake input pressure pE is generated and in the second switch position Z2 a high foot brake input pressure pE is generated at the foot brake venting connection 11e of the foot brake valve 11. This foot brake input pressure is distributed by the foot brake valve 11 in the following manner as the service brake control pressure pA, pB at the axle modulators 9, 10 in the corresponding braking circuits A, B:

In accordance with FIG. 3, a dual-circuit foot brake valve 11 having the corresponding control connections 11a, 11b, supply connections 11c, 11d and the foot brake venting connection 11e is illustrated in an exemplary manner and said foot brake valve may be actuated in an automated manner or mechanically via the control piston 50 by the driver. In a first control position X1, the foot brake valve 11 is actuated in a manual or automated manner. If the control piston 50 arrives in this case after a specific actuating travel W against a first piston 51 (grading piston), this is pushed downward in such a manner that a first inlet opening 52 is continuously opened depending upon the actuating travel W, as a result of which a throughflow of the pressure medium is rendered possible from the first pressure medium reservoir 20A via the first supply connection 11c and also an operating chamber 11f into the first control connection 11a. The operating chamber 11f is consequently that part of the foot brake valve 11 through which the pressure medium supplying the two braking circuits A, B flows. The level of the first service brake control pressure pA that is consequently output from the first control connection 11a for the first axle modulator 9 in the first braking circuit A conforms to the actuating travel W.

As the control piston 50 is actuated and the pressure medium is released from the first pressure medium reservoir 20A, a pressure simultaneously also acts via an opening 53 on a second piston 54 (relay piston) that thereupon likewise moves downward and simultaneously moves a third piston 55. This piston thereupon arrives against a fourth piston 56 that is consequently likewise moved downward, as a result of which a second inlet opening 57 is continuously opened depending upon the actuating travel W. As a consequence, a throughflow of the pressure medium from the second pressure medium reservoir 20B via the second supply connection 11d and the operating chamber 11f into the second control connection 11b may be rendered possible and a corresponding second service brake control pressure pB may be specified to the second axle modulator 10 of the second braking circuit B.

The third piston 55 in this case may also be mechanically actuated in that in the case of a corresponding actuation of the control piston 50 said piston presses against a plunger 58 that is fixedly connected to the third piston 55.

As soon as the control piston 50 and the third piston 55 press against the first piston 51 or the fourth piston 56, on the one hand the pressure medium for the corresponding braking circuit A, B is released and simultaneously a connection of the control connections 11a, 11b to a venting chamber 61 that leads to the foot brake venting connection 11e is closed. This connection between the control connections 11a, 11b and the venting chamber 61 is only produced if the foot brake valve 11 is not actuated in a second control position X2 of the control piston 50 with the result that the braking circuits A, B may be accordingly vented in order to reduce an acting braking force in that the service brake braking pressure p1, p2, p3, p4 or the service brake control pressure pA, pB is reduced.

This is the case in the normal operation if the 3/2 directional control valve 16 is brought into the first switch position Z1 when the foot brake valve 11 is not actuated. The two braking circuits A, B are then short circuited to the bypass venting facility 17 via the 3/2 directional control valve 16, the foot brake venting connection 11e, the venting chamber 61, the operating chamber 11f and the two control connections 11a, 11b of the foot brake valve 11 and consequently a reduction of the service brake control pressure pA, pB and consequently also a reduction of the service brake braking pressure p1, p2, p3, p4 are achieved.

In the second switch position Z2 of the 3/2 directional control valve 16 conversely the foot brake venting connection 11e of the foot brake valve 11 is connected to the bypass pressure medium reservoir 20C with the result that a high pressure—the bypass reservoir pressure pVC—of by way of example approximately 8 bar prevails in the venting chamber 61. The control piston 50 and in accordance with this exemplary embodiment also the pistons 51, 54, 55, 56 are moreover held in their closed positions by means of the acting pressure with the result that pressure medium at approximately the bypass reservoir pressure pVC only passes from the venting chamber 61 via the operating chamber 11f into the two control connections 11a, 11b. As a consequence, a service brake control pressure pA, pB that corresponds approximately to the bypass reservoir pressure pVC is imposed upon the respective axle modulator 9, 10 of the respective braking circuit A, B with the result that the vehicle 200 may be further braked. The bypass reservoir pressure pVC is at most influenced by means of the throughflow of the foot brake venting connection 11e, the venting chamber 61, the operating chamber 11f and also the control connections 11a, 11b with the result that the foot brake valve 11 does not have a grading effect on the foot brake input pressure pE. On the contrary, the foot brake input pressure pE is essentially transmitted through the foot brake valve 11 uninfluenced. The level of the foot brake input pressure pE is already determined prior to entering the foot brake valve 11.

The service brakes 1, 2, 3, 4 may therefore be actuated via the foot brake valve 11 either in a manual or automated manner in dependence upon a mechanical imposition V1, in other words by means of a manual or automated mechanically graded actuation of the foot brake valve 11 or by means of an electropneumatic imposition V2, in other words an electrical actuation of the 3/2 directional control valve 16 and a pneumatic imposition of a corresponding foot brake input pressure pE, wherein in the case of the electropneumatic imposition V2, the foot brake input pressure pE is not influenced in dependence upon a movement of the control piston 50, in other words in dependence upon an actuation of the foot brake valve 11.

The term "mechanical actuation of the foot brake valve 11" is understood to mean in this case an arbitrary movement of the control piston 50 by the actuating travel W, said movement being requested in a manual or automatic manner, by way of example being initiated electrically, mechanically or pneumatically. The control piston 50 is in this case the piston in the foot brake valve 11, which in the case of an actuating unit being actuated, by way of example a brake pedal, converts this mechanical actuation into an actuation-dependent throughflow of pressure medium from the pressure medium reservoir 20A, 20B through the supply connections 11c, 11d and the operating chamber 11f to the control connections 11a, 11b of the foot brake valve 11. The control piston so consequently ensures a graded release of pressure medium from one of the pressure medium reservoirs 20A, 20B to the axle modulators 9, 10 or the wheel brakes 1, 2, 3, 4, wherein for this purpose the further pistons 51, 54, 55, 56 are influenced in the operating chamber 11f as described above. The control piston 50 itself in this exemplary embodiment only limits the operating chamber 11f in the upward direction. A pressure medium that flows into the operating chamber 11f consequently acts on the control piston 50 at most in a pressure-releasing manner.

If the foot brake valve 11 is not actuated, in the redundancy case, by way of example in the event of the driver not paying attention or if said driver is not at the wheel, a braking procedure may thus nevertheless be initiated in that the 3/2 directional control valve 16 is transferred electronically into the second switch position Z2, in order to switch from a venting procedure to a high service brake control pressure pA, pB by means of which the wheel brakes 1, 2, 3, 4 are preferably completely actuated. Consequently, it is achieved in a simple manner that the vehicle 200 can be brought to a standstill in an electronically controlled manner with maximum braking effect in the case of a second switch position Z2 being set. This is in fact also the case if an electronic actuation of the axle modulators 9, 10 fails.

The setting of the corresponding switch position Z1, Z2 of the 3/2 directional control valve 16 is controlled by means of a bypass control unit 130 (bypass ECU) that may engage in the braking procedure by way of example in the event of a failure of the assistance control unit 120 or of the service brake control unit 110 or of the electrical actuation of the corresponding axle modulator 9, 10 in that said bypass control unit outputs a bypass signal SU via which the 3/2 directional control valve 16 is energized. A failure of the service brake control unit 110 or of the assistance control unit 120 or of the electrical actuation of the axle modulators 9, 10 may in this case be determined by way of example via a diagnostic signal SD.

In order to ensure a supply of energy to the bypass control unit 130 in the redundancy case, a second energy source 49B is provided that is independent of a first energy source 49A that supplies the service brake control unit 110, the assistance control unit 120 and the bypass control unit 130. The first energy source 49A and the second energy source 49B are both connected to a generator 49C, by way of example an alternator of the commercial vehicle 200. In the event of a failure of the first energy source 49A in which the electropneumatic brake system 100a may no longer be electrically controlled via the service brake control unit 110 and the axle modulators 9, 10, an electropneumatic actuation via the bypass control unit 130 is thus ensured.

Alternatively, it is also possible to use only the first energy source 49A that is connected to the generator 49C, said energy source being connected via a fuse to the service brake control unit 110 and the assistance control unit 120 and said energy source being connected via a further fuse to the bypass control unit 130.

Figure 1B:
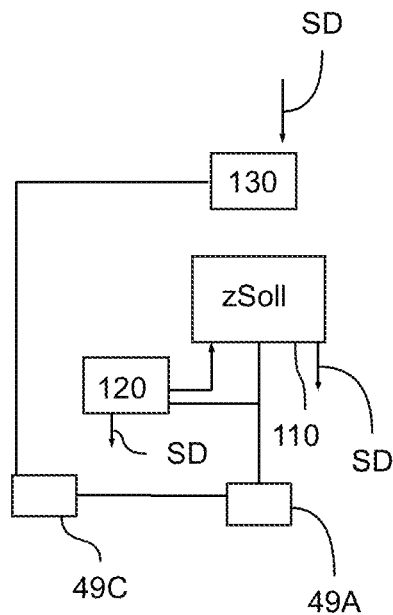

In accordance with FIGS. 1b, c, d, alternative concepts for a redundant energy supply are illustrated. In accordance with an alternative embodiment that is illustrated in FIG. 1b, it is provided to connect the bypass control unit 130 in a corresponding manner directly to the generator 49C thus ensuring an energy supply, and to connect the service brake control unit 110 and the assistance control unit 120 to the first energy source 49A. The generator 49C and the first energy source 49A are in this case separated from one another in such a manner that a short circuit in the generator 49C does not necessarily ensure a short circuit in the first energy source 49A and conversely with the result that they may supply energy in the redundancy case independently of one another.

Figure 1C:
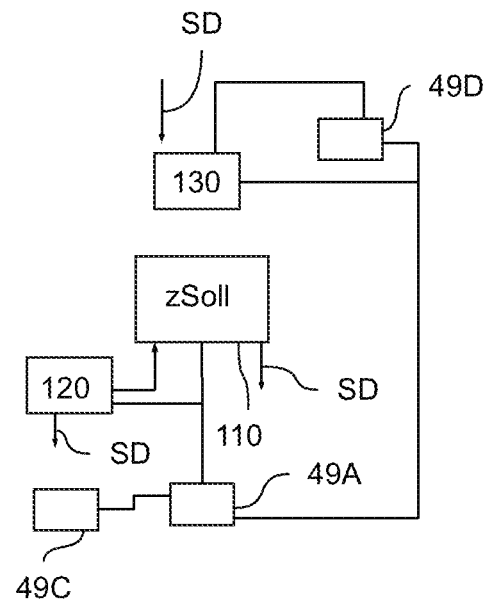

In accordance with an embodiment that is illustrated in FIG. 1c, it is provided to use a short-term accumulator 49D, by way of example a capacitor, in particular a power cap, as an energy source, said accumulator being charged by the first energy source 49A in the normal operation. If the first energy source 49A fails, the charged short-term accumulator 49D is used as an energy source for the bypass control unit 130.

Figure 1D:
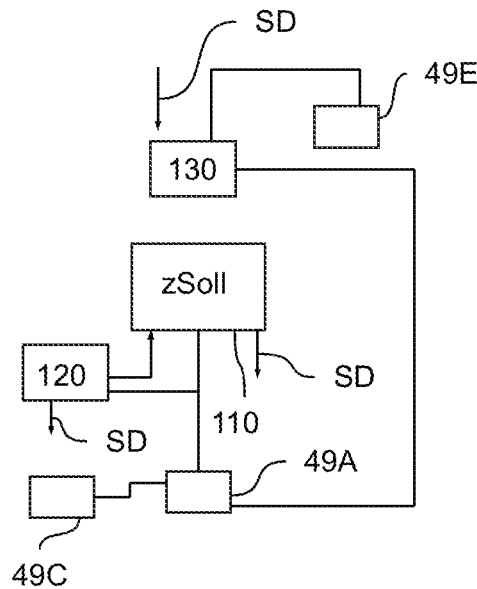

In accordance with a further embodiment, in accordance with FIG. 1d it is provided to use a high voltage accumulator 49E as a redundant energy supply, said high voltage accumulator being used in hybrid vehicles as an energy source for a drive train. This high voltage accumulator is likewise independent of the first energy source 49A and may consequently be used as a redundant energy source for the bypass control unit 130.

Alternatively, an additional redundant vehicle electrical system may also be constructed.

In the first switch position Z1, the 3/2 directional control valve 16 is not energized, in other words the 3/2 directional control valve 16 is not actuated by the bypass control unit 130 using the bypass signal SU. This first switch position Z1 is consequently a stable switch position, into which the 3/2 directional control valve 16 automatically falls back in the absence of a specified bypass signal SU, which may be achieved by way of example by means of a spring preloading. Consequently, even in the event of a failure of the bypass control unit 130 or the second energy source 49B it is ensured that if the foot brake valve 11 is not actuated a release of pressure is achieved via the bypass venting facility 17 and consequently a withdrawal of a braking procedure that where applicable has been actuated in advance is achieved. The second switch position Z2 is initiated by means of outputting a corresponding bypass signal SU that ensures the 3/2 directional control valve 16 is energized.

In order to also be able to achieve an electronically specified, graded braking effect in the redundancy case, the 3/2 directional control valve 16 is actuated in a pulsed manner by the bypass control unit 130, by way of example using a pulse-width modulated bypass signal SU. In other words, the 3/2 directional control valve 16 is alternately switched between the first switch position Z1 and the second switch position Z2. As a consequence, a pulsing foot brake input pressure pE is specified to the foot brake venting connection 11e, said foot brake input pressure ensuring via the control connections 11a, 11b a likewise pulsing service brake control pressure pA, pB in the respective braking circuits A, B, said service brake control pressure oscillating in this case back and forth between the atmospheric pressure pAtm (first switch position Z1) and the bypass reservoir pressure pVC (second switch position Z2).

A temporal curve of this type of the foot brake input pressure pE is illustrated in an exemplary manner in FIG. 2, wherein a foot brake input pressure curve pEpwm (dashed curve) is produced by means of the pulse-width modulation (PWM) of the bypass signal SU, said foot brake input pressure curve being in particular dependent upon a pulse time t1 that indicates the duration of a pulsed actuation via the bypass signal SU, in other words the 3/2 directional control valve 16 being energized, and upon a pause time t2 that indicates the duration the 3/2 directional control valve 16 is not energized. The pulse time t1 may be between 5 ms and 1000 ms and the pause time t2 may be between 0 ms and 2000 ms. The foot brake input pressure curve pEpwm oscillates back and forth between the atmospheric pressure pAtm and approximately the bypass reservoir pressure pVC with the result that a different foot brake input pressure pE is output depending upon the point in time t. The bypass reservoir pressure pVC in this case is not fully achieved since the foot brake input pressure pE may not increase by means of the throughflow of the lines within the pulse time t1 to the bypass reservoir pressure pVC prior to the 3/2 directional control valve 16 being brought back into the first switch position Z1.

In order to smooth the oscillating foot brake input pressure curve pEpwm and consequently to achieve a more precise coordination, a throttle 25 is provided that represents a bottleneck for the pressure medium from the bypass pressure medium reservoir 20C. The volume flow Q from the bypass pressure medium reservoir 20C to the second directional control input 16b may be reduced by means of the throttle 25. The bypass reservoir pressure pVC is consequently built up slower at the directional control output 16c when switching into the second switch position Z2 with the result that the 3/2 directional control valve 16 is already set back into the first switch position Z1 in the case of a lower foot brake input pressure pE. The foot brake input pressure curve pEpwm is therefore smoothed and provides a smoothed foot brake input pressure curve pEgl (solid curve) that is illustrated in FIG. 2, wherein said curve no longer increases as intensely and consequently ensures less jerking during the braking procedure.

The oscillating pEpwm and smoothed pressure curve pEgl by means of the pulse-width modulated actuation via the bypass signal SU has a positive effect on the driving stability since this acts as a type of intermittent braking procedure SF if times are used for the pulse time t1 and for the pause times t2 with which it is ensured that a wheel that tends to lock may rotate again. This is by way of example the case if the foot brake input pressure pE or the service brake braking pressure p1, p2, p3, p4 recurrently falls below a limit pressure of by way of example 1 bar at least for a limit time of by way of example 0.25 s. In this case, it is ensured that a wheel that tends to lock rotates again.

This is in particular advantageous if in the redundancy case a brake slip regulation procedure via the service brake control unit 110 and the electrical actuation of the respective axle modulator 9, 10 via the corresponding control signal SA, SB no longer functions. The pulse time t1 and the pause time t2 may be configured in this case in such a manner that acceptable values for the deceleration, the driving stability and the steerability may be ensured in the case of a redundant engagement.

Moreover it can be achieved that the bypass control unit 130 in the event of a failure of the service brake control unit 110 or of the electrical function of the foot brake valve 11 can identify via an additional pressure sensor or pressure switch 18, which in accordance with the illustrated embodiment taps the first service brake control pressure pA at the front axle VA, whether the driver has requested a braking procedure via the foot brake valve 11. As a consequence, it is possible to conclude that the driver is actively engaging in the braking procedure and therefore the redundant electropneumatic braking procedure via the bypass control unit 130 may be interrupted. On the other hand, this information may also be relayed to other assistance systems in the vehicle 200 with the result that in the event of a failure of the service brake control unit 110, said systems may also fall back to the driver request. Furthermore, latent malfunctions in the electropneumatic brake system 100a may be identified by means of a plausibility check.

Figure 4:
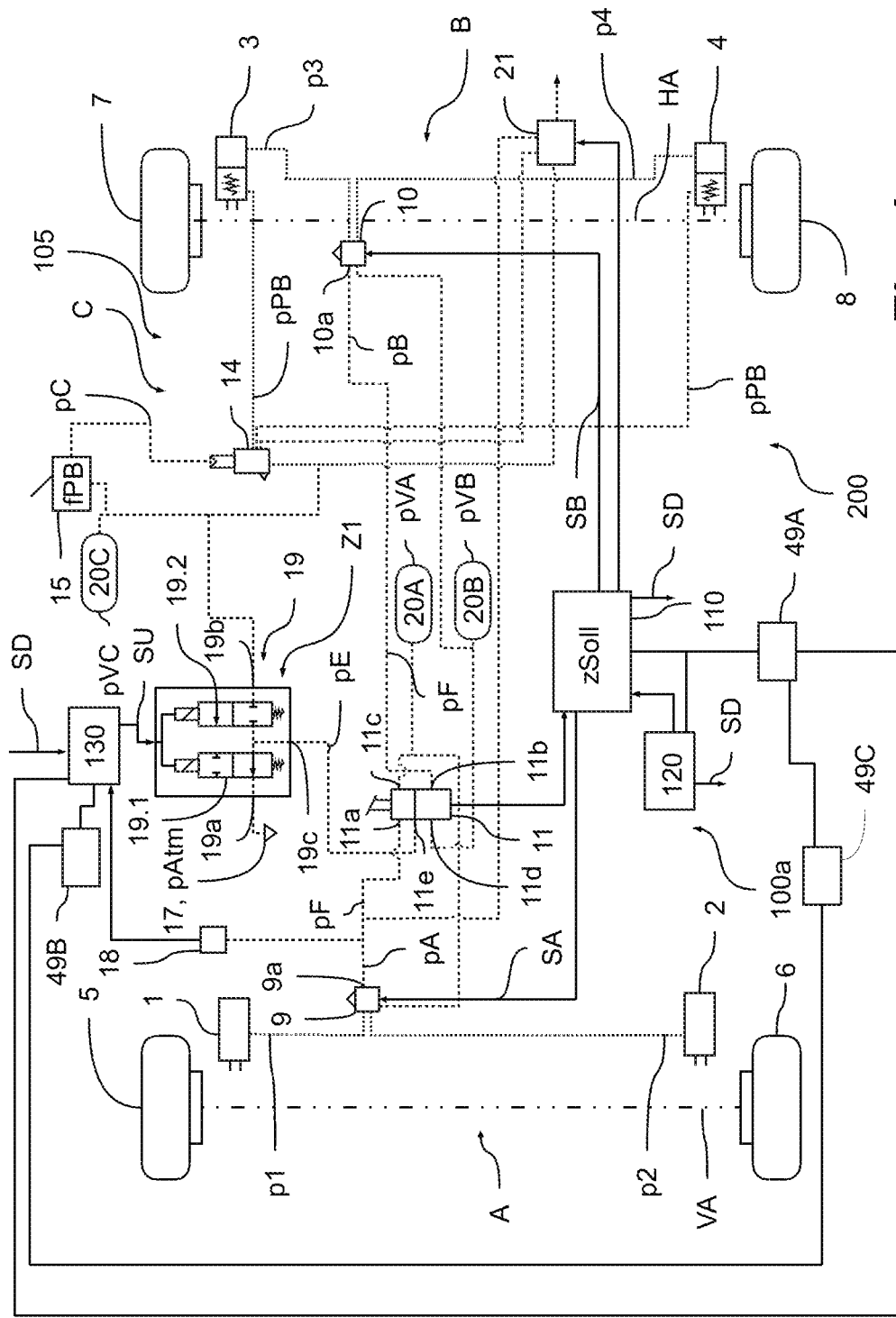
FIG. 4 illustrates a brake system having a second bypass valve arrangement.

In accordance with FIG. 4, the foot brake valve 11 in accordance with an alternative embodiment is connected via the foot brake venting connection 11e to a third directional control connection 19c of a second bypass valve arrangement 19 via which a specific foot brake input pressure pE may likewise be specified to the foot brake valve 11 depending upon the switch position Z1, Z2, Z3 of the second bypass valve arrangement 19. The second bypass valve arrangement 19 in this case is embodied by means of two 2/2 directional control valves 19.1, 19.2 that depending upon the electrical actuation in a first switch position Z1 of the second bypass valve arrangement 19 short circuit the third directional control connection 19c via a first directional control connection 19a to the bypass venting facility 17 and in a second switch position Z2 of the second bypass valve arrangement 19 short circuit the third directional control connection 19c via a second directional control connection 19b to the bypass pressure medium reservoir 20C.

In order to achieve this, in the first switch position Z1 of the second bypass valve arrangement 19, the second 2/2 directional control valve 19.2 is closed and the first 2/2 directional control valve 19.1 is opened. In the second switch position Z2 of the second bypass valve arrangement 19, the second 2/2 directional control valve 19.2 is opened and the first 2/2 directional control valve 19.1 is closed. In a third switch position Z3 of the second bypass valve arrangement 19 the foot brake input pressure pE may also be maintained by means of closing the two 2/2 directional control valves 19.1, 19.2.

The two 2/2 directional control valves 19.1, 19.2 are controlled by means of the bypass control unit 130 by means of the bypass signal SU. As a consequence, a pneumatic specification of a service brake control pressure pA, pB may be performed in an electronically controlled manner—as is also the case with the 3/2 directional control valve 16 in FIG. 1a—in dependence upon the foot brake input pressure pE so as to provide the redundant pneumatic actuation of the axle modulators 9, 10.

Figure 5:
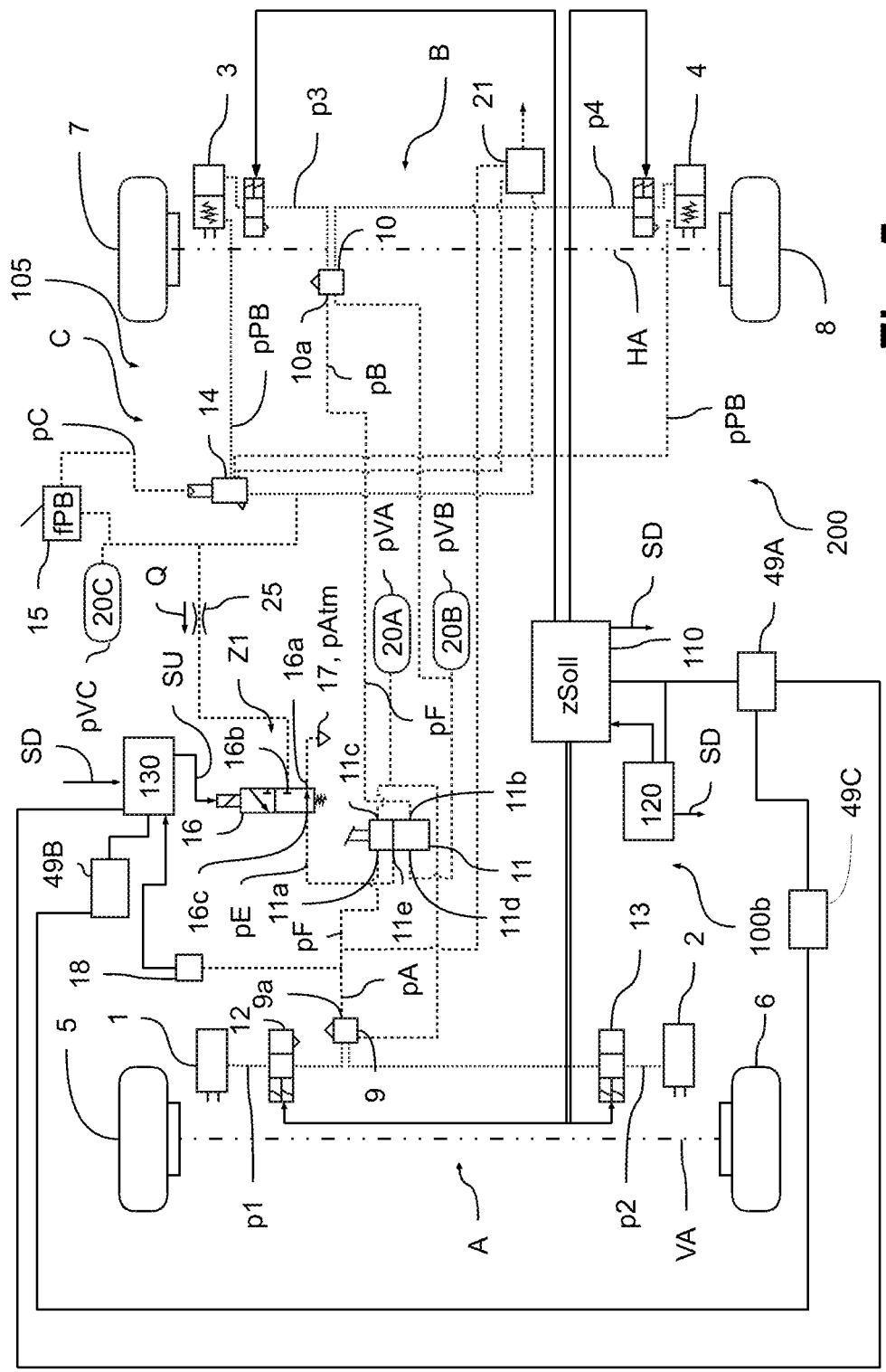
FIG. 5 illustrates a brake system having a purely pneumatic actuation of service brakes.

In accordance with FIG. 5, a purely pneumatic brake system 100b is illustrated without the axle modulators 9, 10 being electronically actuated. In other words, in the first and in the second braking circuit A, B in the normal operation a braking procedure is only performed by means of a pneumatic specification to the axle modulators 9, 10 via the respective pneumatic control input 9a, 10a. An electrical control procedure via the service brake control unit 110 is only performed in order to embody an ABS functionality. For this purpose, two ABS control valves 12, 13 are connected upstream of the wheel brakes 1, 2 of the front axle VA and of the rear axle HA respectively and it is possible via said ABS control valves to react controlled by the service brake control unit 110 to a brake slip event at one of the wheels 5, 6 of the front axle VA or at one of the wheels 7, 8 of the rear axle HA. An electropneumatic imposition V2 may be performed via the in this case first bypass valve arrangement 16 or the 3/2 directional control valve—as described above—in the redundancy case. The embodiments in accordance with the preceding figures may be used in a similar manner to this purely pneumatic brake system 100b, in other words in particular in lieu of the first bypass valve arrangement 16, the second bypass valve arrangement 19 may also be used with the two 2/2 directional control valves 19.1, 19.2 in order to specify the service brake control pressure pA, pB in an electropneumatic manner.

Figure 6:
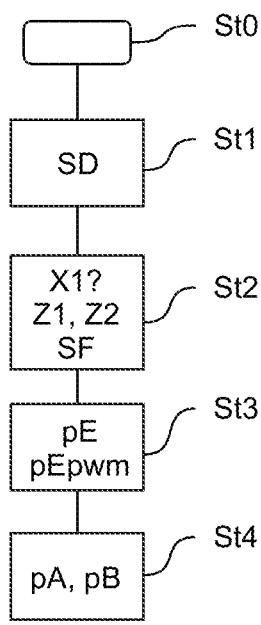
FIG. 6 illustrates a flow diagram representing a method according to an embodiment of the invention.

The actuation of the brake systems 100a, 100b in accordance with FIG. 6 may be performed by way of example in the following manner:

The method starts in a starting step St0, by way of example with starting the vehicle 200.

In a first step St1, the bypass control unit 130 determines via the diagnostic signal SD whether a failure or a defect has occurred in the electrical actuation of the axle modulators 9, 10.

If this is the case, in other words in a redundancy case, in a second step St2 a bypass signal SU is output to the respective bypass valve arrangement 16, 19 by the bypass control unit 130 in order to switch the respective bypass valve arrangement 16, 19 from the first switch position Z1 into the second switch position Z2 and to brake the vehicle 200 into a safe state. The electrically controlled braking procedure may be performed by way of example if it has been determined that the driver is not manually engaging in the braking procedure, in other words the first control position X1 of the control piston 50 is not set, which prevents an electropneumatic imposition V2. This may be performed by way of example via the pressure sensor or pressure switch 18.

In order to achieve an intermittent braking function SF in the redundancy case and consequently to improve the driving stability and the steerability, the bypass signal SU may also be specified in a pulse-width modulated manner, in other words said switching is performed back and forth between the first and the second switch position Z1, Z2.

In a third step St3, a foot brake input pressure pE is imposed upon the foot brake venting connection 11e of the foot brake valve 11 on account of the 3/2 directional control valve 16 or the two 2/2 directional control valves 19.1, 19.2 of the respective bypass valve arrangement 16, 19 being energized, said foot brake input pressure in the case of a continuous actuation corresponding to the where applicable pressure-adjusted bypass reservoir pressure pVC or in the case of a pulse-width modulated actuation corresponding to the pulsing foot brake input curve pEpwm, pEgl. As a consequence, in a fourth step St4 in the case of a foot brake valve 11 not being actuated a corresponding service brake control pressure pA, pB is imposed upon the axle modulators 9, 10 and furthermore a corresponding service brake braking pressure p1, p2, p3, p4 is generated.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1, 2, 3, 4 Wheel brake
5, 6, 7, 8 Wheels
9 First axle modulator
9a First pneumatic control input
10 Second axle modulator
10a Second pneumatic control input
11 Foot brake valve
11a First control connection
11b Second control connection
11c First supply connection
11d Second supply connection
11e Foot brake venting connection
11f Operating chamber
12, 13 ABS control valves
14 Parking brake relay valve
15 Parking brake valve
16 First bypass arrangement (3/2 directional control valve)
16a First directional control input
16b Second directional control input
16c Directional control output
17 Bypass venting facility
18 Pressure sensor/pressure switch
19 Second bypass arrangement
19.1 First 2/2 directional control valve
19.2 Second 2/2 directional control valve
19a First directional control connection
19b Second directional control connection
19c Third directional control connection
20A First pressure medium reservoir of the first braking circuit A
20B Second pressure medium reservoir of the second braking circuit B
20C Bypass pressure medium reservoir
21 Trailer control valve
25 Throttle
49A First energy source
49B Second energy source
49C Generator
49D Short-term storage device
49E High voltage storage device
50 Control piston
51 First piston
52 First inlet opening
53 Opening
54 Second piston
55 Third piston
56 Fourth piston
57 Second inlet opening
58 Plunger
61 Venting chamber
100a Electropneumatic brake system
100b Purely pneumatic brake system
110 Service brake control unit (ECU)
120 Assistance control unit (ADAS-ECU)
130 Bypass control unit (Bypass-ECU)
200 Vehicle
A, B, C Braking circuits
fPB Parking brake force
p1, p2, p3, p4 Service brake braking pressure
pA, pB Service brake control pressure pAtm Atmospheric pressure
pC Parking brake control pressure
pE Foot brake input pressure
pEpwm Foot brake input pressure curve
pEgl Smoothed foot brake input pressure curve
pG Limit pressure
pHigh High pressure level
pLow Low pressure level
pPB Parking brake braking pressure
pVA Reservoir pressure in the first pressure medium reservoir 20A
pVB Reservoir pressure in the second pressure medium reservoir 20B
pVC Bypass reservoir pressure in the bypass pressure medium reservoir 20C
Q Volume flow
SA, SB Control signal
SD Diagnostic signal
SF Intermittent braking function
SU Bypass signal
t Point in time
t1 Pulse time
t2 Pause time
V1 Mechanical imposition
V2 Electropneumatic imposition
VA, HA Vehicle axles
W Actuating travel
X1 First control position of the control piston 50
X2 Second control position of the control piston 50
Z1, Z2 Switch position
zSoll Vehicle desired deceleration
St1, St2, St3, St4 Steps of the method

The invention claimed is:

1. An electronically controllable pneumatic brake system for a vehicle, the electronically controllable pneumatic brake system comprising:
wheel brakes for braking wheels of the vehicle, wherein axle modulators specify a service brake braking pressure to the wheel brakes in dependence upon a service brake control pressure;
a foot brake valve configured to pneumatically specify the service brake control pressure to the axle modulators, wherein the service brake control pressure can be generated by the foot brake valve in dependence upon a mechanical imposition or in dependence upon an electropneumatic imposition; and
a bypass valve arrangement configured to specify a foot brake input pressure to the foot brake valve, the foot brake input pressure being used as an electropneumatic imposition,
wherein the bypass valve arrangement imposes a low pressure level upon the foot brake valve in a first switch position and the bypass valve arrangement imposes a high pressure level upon the foot brake valve in a second switch position as an electropneumatic imposition with the result that the foot brake input pressure may be specified in dependence upon the low pressure level and/or in dependence upon the high pressure level,
wherein the bypass valve arrangement is flowably connected to a venting chamber of the foot brake valve with the result that the foot brake input pressure that is specified by the bypass valve arrangement may be passed through as an electropneumatic imposition via the venting chamber and an operating chamber of the foot brake valve directly to the axle modulators as a service brake control pressure.

2. The electronically controllable pneumatic brake system as claimed in claim 1, wherein in the first switch position the bypass valve arrangement connects the foot brake valve to a bypass venting facility so as to impose the low pressure level and in the second switch position the bypass valve arrangement connects the foot brake valve to a bypass pressure medium reservoir so as to impose the high pressure level so as to output an electropneumatic imposition in dependence upon an atmospheric pressure and/or in dependence upon a bypass reservoir pressure.

3. The electronically controllable pneumatic brake system as claimed in claim 2, wherein the bypass valve arrangement flowably connects the venting chamber of the foot brake valve either to the bypass pressure medium reservoir or to the bypass venting facility.

4. The electronically controllable pneumatic brake system as claimed in claim 2, wherein a throttle is provided between the bypass pressure medium reservoir, which in the second switch position is connected so as to conduct flow via the bypass valve arrangement to the venting chamber, and the bypass valve arrangement as to limit a volume flow passing to the bypass valve arrangement.

5. The electronically controllable pneumatic brake system as claimed in claim 1, wherein the electropneumatic imposition is an imposition that is independent of a mechanical actuation of the foot brake valve by means of moving a control piston of the foot brake valve,
with the result that the foot brake input pressure that is imposed by means of the bypass valve arrangement may flow essentially uninfluenced through the foot brake valve and may be imposed by the foot brake valve as a service brake control pressure upon the axle modulators.

6. The electronically controllable pneumatic brake system as claimed in claim 1, wherein the venting chamber is not flowably connected via the operating chamber to the control connections in a mechanically actuated position of the foot brake valve during an adjustment of the control piston of the foot brake valve into a first control position with the result that the service brake control pressure may only be specified in an actuated position of the foot brake valve in dependence upon the manual imposition, and
in that the venting chamber is flowably connected via the operating chamber to the control connections in a mechanically non-actuated position of the foot brake valve during an adjustment of the control piston of the foot brake valve into a second control position with the result that the service brake control pressure may only be specified in a mechanically non-actuated position in dependence upon the electropneumatic imposition.

7. The electronically controllable pneumatic brake system as claimed in claim 1, wherein the bypass valve arrangement is flowably connected via a venting connection of the foot brake valve to the venting chamber.

8. The electronically controllable pneumatic brake system as claimed in claim 1, wherein a first bypass valve arrangement is embodied as an electronically controllable 3/2 directional control valve having two switch positions, wherein the low pressure level may be imposed upon the venting chamber in the first switch position of the 3/2 directional control valve via the 3/2 directional control valve, and the high pressure level may be specified to the venting chamber in the second switch position via the 3/2 directional control valve.

9. The electronically controllable pneumatic brake system as claimed in claim 1, wherein a second bypass valve arrangement comprises two 2/2 directional control valves, wherein the low pressure level may be specified to the venting chamber by means of a first 2/2 directional control valve and the high pressure level may be specified by means of a second 2/2 directional control valve, wherein the low pressure level may be specified to the venting chamber in the first switch position of the second bypass valve arrangement by means of the first 2/2 directional control valve and simultaneously a specification of the high pressure level to the venting chamber may be prevented by means of the second 2/2 directional control valve, and a specification of the low pressure level may be prevented in the second switch position of the second bypass valve arrangement by the first 2/2 directional control valve and simultaneously the high pressure level may be specified to the venting chamber by the second 2/2 directional control valve.

10. The electronically controllable pneumatic brake system as claimed in claim 1, wherein the bypass valve arrangement is monostable and the first switch position represents a stable switch position, into which the bypass valve arrangement automatically falls back if an actuation is not performed.

11. The electronically controllable pneumatic brake system as claimed in claim 1, wherein the bypass valve arrangement may be electrically actuated via a bypass signal that is specified by a bypass control unit.

12. The electronically controllable pneumatic brake system as claimed in claim 11, wherein a pulse-width modulated bypass signal may be output by the bypass control unit so as to alternately switch between the first switch position and the second switch position so as to embody an intermittent braking function by means of varying the foot brake input pressure.

13. The electronically controllable pneumatic brake system as claimed in claim 12, wherein the bypass valve arrangement may be alternately switched for a pulse time into the second switch position and for a pause time into the first switch position so as to alternately switch the bypass valve, wherein the pulse time is between 5 ms and 1000 ms and the pause time is between 0ms and 2000 ms.

14. A method for electronically controlling a pneumatic brake system, the method comprising:
determining whether a failure or a defect has occurred in the electronic actuation of the axle modulators;
actuating a bypass valve arrangement via a bypass signal in the event of a failure or a defect being determined and a foot brake valve not being actuated so as to embody a redundancy by outputting an electropneumatic imposition;
outputting a foot brake input pressure as an electropneumatic imposition by the bypass valve arrangement into the venting chamber and/or to a foot brake venting connection of the foot brake valve;
directly relaying the foot brake input pressure as the service brake control pressure to the axle modulators for the redundant electropneumatic actuation of the wheel brakes.

15. The method as claimed in claim 14, wherein the bypass valve arrangement is electrically actuated via a bypass signal that is specified by the bypass control unit, wherein the bypass valve arrangement transfers into the first switch position if an actuation is not performed via the bypass signal and the bypass valve arrangement transfers into the second switch position if an actuation is performed via the bypass signal.

16. The method as claimed in claim 15, wherein the bypass control unit specifies the bypass signal in a pulse-width modulated manner, wherein the bypass valve arrangement is consequently alternately switched back and forth between the first switch position and the second switch position, wherein the bypass valve arrangement is brought for this purpose into the second switch position for the pulse time and into the first switch position for the pause time with the result that the service brake braking pressure varies so as to embody the intermittent braking function.

17. The method as claimed in claim 14, wherein the bypass valve arrangement is only actuated if the driver does not actuate the foot brake valve.

18. The method as claimed in claim 14, wherein a low pressure level is imposed by the bypass valve arrangement in the first switch position, and a high pressure level is imposed in the second switch position.

19. A vehicle, in particular a commercial vehicle, having an electronically controlled pneumatic brake system as claimed in claim 1.

* * * * *